United States Patent [19]

Crabtree et al.

[11] 4,139,345
[45] Feb. 13, 1979

[54] DYEING PROCESS AND COMPOSITIONS FOR USE THEREIN

[75] Inventors: Allen Crabtree; William J. Marshall; David W. Plant, all of Manchester, England

[73] Assignee: Imperial Chemical Industries Limited, London, England

[21] Appl. No.: 716,286

[22] Filed: Aug. 20, 1976

[30] Foreign Application Priority Data

Sep. 9, 1975 [GB] United Kingdom ............... 37069/75

[51] Int. Cl.² ............................................. D06P 1/642
[52] U.S. Cl. ............................................. 8/25; 8/1 N; 8/41 R
[58] Field of Search .................. 8/1 N, 100, 41 R, 25

[56] References Cited

U.S. PATENT DOCUMENTS 3,046,075  7/1962  Kantaer ................................. 8/1 N

FOREIGN PATENT DOCUMENTS 570326  2/1959  Belgium ....................................... 8/1 N
2324809  1/1974  Fed. Rep. of Germany.

OTHER PUBLICATIONS

Derwent, Abstract of German Pat. 1,230,393, vol. 7, No. 3, 1966, p. 2.
Derwent, France, Abstract of French Pat. 2114998, 11/20/70.

*Primary Examiner*—Donald Levy
*Attorney, Agent, or Firm*—Cushman, Darby & Cushman

[57] ABSTRACT

A process for the coloration of a hydroxy substituted organic polymeric substrate by heating it to at least 93° C. with a water-soluble dyestuff containing one or more groups of the formula:

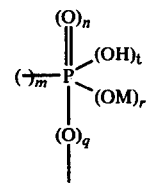

where M is a metal
n is 0 or 1
q is 0 or 1
m is 0, 1 or 2
r = 1 or 2
t = 0 or 1 and r+t is not greater than 2 and when n = 1, m+t+r+q is not greater than 3, in the presence of a carbodiimide and a salt or a volatile amine.

This process is valuable for coloring, in particular, cellulose textiles. It permits the use of dyestuffs in the form of metal, especially sodium salts, thereby avoiding the necessity of having dyes as free acid or ammonium salts which related known processes require.

11 Claims, No Drawings

DYEING PROCESS AND COMPOSITIONS FOR USE THEREIN

The present invention relates to dyeing processes and compositions for use therein.

The German Offenlegungschrift No. 2,324,809 describes a process for colouring textile materials with dyes bearing one or more phosphorus acid groups i.e. acidic groups containing a phosphorus atom, in particular phosphonic acid groups. The process relates to textiles fibres particularly cellulose which can be chemically bonded to phosphorus acid dyestuffs by heating in the presence of a carbodiimide at a temperature of at least 93° C. The process is believed to result in the dye forming a phosphorus acid ester link to the OH groups in the textile substrate. The process is conducted at an acid to weakly alkaline pH thereby offering advantages over previously available reactive dye systems which needed distinctly alkaline pHs to ensure fixation.

The dyes used in the process disclosed in OLS No. 2,324,809 were used with the phosphorus acid group in its free acid form although any sulphonic acid groups also present in the dye could be there in the form of salts such as sodium viz. as $SO_3Na$. The OLS No. 2,324,809 further discloses the use of dyes in which the phosphorus acid groups were present as the salts with ammonia or a fugitive i.e. volatile amine. Such salts were obtained by reacting the dye with free phosphorus acid group with ammonia or an amine.

To prepare dyes with free phosphorus acid groups e.g. with free phosphonic acid groups it is necessary to isolate the dyestuff from the medium in which it was manufactured at a strongly acid pH e.g. 2-3. On commercial scale of manufacture the use of such acidic media give rise to considerable problems e.g. in corrosion of metallic plant. Dyestuffs containing acid groups are more conveniently isolated in the form of salts e.g. alkali metal salts such as sodium from essentially neutral or alkaline media. Conventional water soluble cellulose reactive dyes are almost invariably isolated and sold in the form of sodium salts.

Isolation of dyes bearing phosphorus acid groups by conventional methods from essentially neutral media e.g. at pH from 5 to 8 yields dyes in which the phosphorus acid group is in the form of a salt e.g. typically a sodium salt. In the case of phosphonic acid groups these will be as mono and/or di salts the amounts of such groups depending on the exact nature of the dyestuff and the pH used in its isolation. It has been observed that if dyes having phosphonic acid groups present as sodium salts are used in the process of OLS No. 2,324,809 the fixation is adversely affected often leading to unacceptably low levels of dyeing.

It has however been found, surprisingly, that good, often enhanced, levels of fixation result if such metal salts of the dyes are used in conjunction with an ammonium salt or volatile amine salt.

According to the present invention there is provided a process for the colouration of a hydroxy substituted organic polymeric substrate by heating it to at least 93° C. with a water-soluble dyestuff containing one or more groups of the formula:

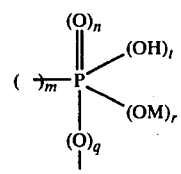

where M is a metal
n = 0 or 1
q = 0 or 1
m = 0, 1 or 2
r = 1 or 2
t = 0 or 1
and r + t is not greater than 2 and when n = 1, m+t+r+q is not greater than 3, in the presence of a carbodiimide and a salt of ammonia or a volatile amine.

This process is particularly suitable for textile substrates, e.g. fibres and fabrics especially those containing cellulose.

A preferred embodiment of the invention uses dyestuffs containing one or more groups of the formula:

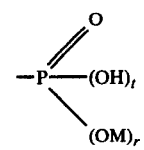

where, M, t, R and t+r have the meanings given above. It is further preferred that the dyestuffs should have 1 or 2 of these groups.

The metal M may be any metal consistent with the requirement that the dyestuff shall be water-soluble, e.g. magnesium may be used in some cases, but it is usually preferred that it is an alkali metal, e.g. lithium, potassium or especially sodium.

The dyestuff may contain other acidic groups particularly sulphonic acid groups and these will usually be in the form of salts of the metal M, viz. as $SO_3M$.

By volatile amine it is meant any amine which is partially or completely displaced from the dyed textile substrate during the process of heating to at least 93° C. As examples of such volatile amines there may be mentioned methylamine, dimethylamine, trimethylamine, ethylamine, diethylamine, triethylamine.

It is usually preferred to use ammonium salts in the process of the present invention.

As salts of ammonia or volatile amines there may be mentioned sulphates, hydrogen sulphates, hydrogen and dihydrogen phosphates, bromide, tartrates, citrates, acetates, formates, benzene sulphonates, adipates and it is particularly preferred to use chlorides, in particular ammonium chloride.

The amount of the salt of ammonia or volatile amine employed may vary widely but it is usually preferred to have an amount equivalent to the phosphorus acid groups present in the dyestuff, i.e. at least one equivalent of ammonia or amine in the form of salt for each OH or OM group attached to a phosphorus atom in the dyestuff, although useful effects can sometimes be obtained with as little as 0.5 equivalents.

It is frequently found advantageous to use up to about 10 equivalents, more particularly from 2-5, especially 2-3 equivalents of ammonium or amine salt for each OH or OM group attached to a phosphorus atom in the dyestuff.

These higher amounts of ammonium or amine salts are often associated with enhanced fixation of the dye. At high concentration of these salts however the dyed textile substrate can exhibit a dulled appearance which is not usually desirable and high concentration of ammonium or amine salts can result in tendering of the fibres.

The presence of metal salts other than those of the dyestuff in the process of the present invention is often found to be deleterious in that it reduces the level of fixation. This can be counteracted by increased use of ammonium or amine salt but it is generally not desirable. Dyestuffs isolated as their metal salts often contain free metal salts, e.g. sodium chloride either as an unavoidable concomitant of the isolation procedure, e.g. salting out, or as a deliberate addition to adjust the strength of the dye composition to a standard level.

For use in the process of the present invention such metal salt should generally be avoided as far as possible. With dyes used as their sodium salts it is usually preferred to employ materials containing less than 5% of free metal salt such as sodium chloride.

The carbodiimides and general conditions for use in the process of the present invention are those set out in OLS No. 2,324,809.

The carbodiimides most convenient for this process on grounds of cheapness and effectiveness are cyanamide and dicyandiamide. Normally either of these is used at a concentration of at least 10g./liter in the dyebath and the usual maximum is 100g./liter of cyanamide or the saturation value of dicyandiamide, i.e. 30g./liter at room temperature. These amounts are given as a typical range for guidance only and relate to the more usual concentration of dyestuff, i.e. around $1 - 3 \times 10^{-2}$ equivalents per litre of dyebath. Mixtures of carbodiimides, e.g. cyanamide and dicyandiamide may be used.

The dyebath will usually be used at a pH of around 5 to 6 which often arises naturally from the constituents used. However pHs of from 2 to 7 may be employed and even up to pH8 in some cases. Any necessary adjustment of pH may be made using phosphoric acid or ammonia.

The heating to fix the dyestuff may range from say 100° C. for 15-20 minutes to say 225° C. 15-60 seconds. Higher temperatures are likely to give thermal damage to the fabric. The time of heating will be adjusted in accordance with the thickness and the weight of the fabric being dyed. If the fabric contains polyester fibres which are being simultaneously coloured by disperse dyes the heating schedule will be confined to the range suitable for these dyes, e.g. at temperatures of 170 to 225° C.

If it is desired to colour the substrates by a printing technique the dye will be applied from a print paste containing the above-mentioned ingredients, formulated as conventional to the printing art, e.g. thickening agents will be incorporated.

The metal salts of phosphorus acid group-bearing dyestuffs used in the process of the present invention may be premixed with the salt of ammonia or a volatile amine and/or the carbodiimide and such mixtures are further features of the present invention.

The process of the present invention can be used in any suitable textile colouration process, e.g. dyeing or printing. It is useful for colouring all forms of natural or regenerated cellulose, e.g. cotton or rayon and is particularly useful for colouring fibre unions especially polyester/cellulose unions when used in conjunction with a disperse dye. Mixtures of disperse dyes and dyes bearing phosphorus acid groups in the form of metal salts with the salt of ammonia or a volatile amine and/or a carbodiimide are further features of the invention.

A major advantage for the present invention is that it permits all the benefits of the process of OLS No. 2,324,809 to be achieved with dyestuffs manufactured by a conventional, convenient process rather than a special, less convenient, process.

EXAMPLE 1

A. Comparative dyeing without salt of ammonia or amine (a) The dyestuff, believed to have the formula:

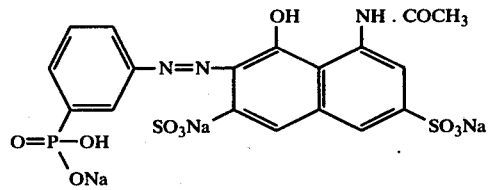

is applied to cellulosic material in the form of unmercerised plain casement as follows:

The cellulose material is padded through an aqueous solution containing dyestuff 16.0g./liter and dicyandiamide 30.0g./liter to 75% expression, then dried for 2 minutes at 110° C. before baking for 1 minutes at 210° C. Loose dye is removed by rinsing in cold, then hot (60° C.) water, soaping for 15 minutes at the boil in water containing 0.5g./liter Synperonic BD 100 before rinsing again in cold water to remove detergent.

The material is dyed to a red shade with low tinctorial yield and having poor fixation.

(b) The dye solution given above containing in addition sodium chloride (4.0%) is applied as above and gave material of a red shade but with lower tinctorial strength (and even lower fixation) than obtained by the dyeing described at (a) above.

(c) The dye solution given in (a) above containing in addition 30% sodium chloride gave material of a red shade when applied as in (a). This had a yet lower and commercially unacceptable tinctorial yield (and fixation than either of the dyeings described in (a) and (b) mentioned above.

B. Process of the invention

When 20 g/liter of NH$_4$Cl was added to the dye liquors prepared as in (a), (b) and (c) above the yields (and fixations) of the dyed material were considerably increased when applied as described in (a).

EXAMPLE 2

When Example 1 Part B is repreated using 5 g/liter rather than 20 g/liter of ammonium chloride once again much better fixation than in Example 1 Part A is obtained though slightly less than in Example 1 Part B. However in this case there was much less tendering of the fibre and dulling of the shade than observed in Example 1 Part B.

EXAMPLES 3 and 4

The amounts of ammonium chloride used in Examples 1B and 2 correspond to 10 and 2½ equivalents of ammonium chloride per OH/ONa of the phosphonic acid group in the dyestuff respectively. Dyeings conducted as Example 1A(a) with the addition of
2gm/liter, i.e. 1 equivalent, of ammonium chloride (Example 3)
1gm/liter, i.e. ½ equivalent, of ammonium chloride (Example 4)
gave significant fixation of the dyestuff compared with Example 1A(a) though rather less than that in Example 2.

EXAMPLES 5-7

The dye liquors in the previous Examples all have a pH which is in the region of 5-6. Repeating the dyeing described Example 1B(a) using a dye liquor adjusted to pH2 with phosphoric acid (Example 5) or to pH7 with ammonia (Example 6) similar results are obtained.

With a dye liquor adjusted to pH8 with ammonia (Example 7) the dyeing was slightly inferior though still showing significant fixation compared with that obtained in Example 1A(a).

EXAMPLES 8-11

The procedure of Example 1B(a) was repeated using the following baking conditions in place of 1 minute at 210° C.:
Example 8 — 30 seconds at 225° C.
Example 9 — 3 minutes at 170° C.
Example 10 — 4 minutes at 150° C.
Example 11 — 15 minutes at 100° C.
similar dyeings are obtained in each case.

EXAMPLES 12-33

Using the procedure of Example 1B(a) replacing the dyestuff with an equivalent amount of the following dyestuffs, adjusting the pH to 5.5 if the dyebath would otherwise be significantly different from this value, there are obtained dyeings of the shades indicated.

| Example | Dyestuff | | Shade |
|---|---|---|---|
| | ![structure with OH, NHCOCH₃, MO₃S, SO₃M, O=P(OQ)(OM)] | | |
| 12 | M = Na | Q = Na | Red |
| 13 | M = K | Q = H | " |
| 14 | M = K | Q = K | " |
| | ![structure with HO, SO₃M, O=P(OQ)(OM)] | | |
| 15 | M = Na | Q = H | Yellow-orange |
| 16 | M = Na | Q = Na | " |
| 17 | M = K | Q = H | " |
| 18 | M = K | Q = K | " |
| 19 | M = Li | Q = H | " |
| 20 | M = Mg/2 | Q = H | " |
| | ![pyrazolone structure with CH₃, CONH₂, HO, C₂H₅, O=P(OM)(OM)] | | |
| 21 | M = Na | | Greenish-yellow |
| 22 | M = K | | " |
| 23 | M = Li | | " |
| 24 | ![structure with N=N-CH-C-COONa, CO, N, SO₃Na, O=P(ONa)(ONa)] | | |
| | | | Reddish-orange |
| 25 | ![structure with OH, COCH₃, N(CH₃), NaO₃S, O=P(OH)(O-Na)] | | |

-continued

| Example | Dyestuff | Shade |
|---|---|---|
| 26 | | Dark blue |
| 27 | | |
| 28 | | Blue |
| 29 | | Violet |
| 30 | | Orange |
| 31 | | Red |
| 32 | | Blue |
| 33 | | Yellow |

The above dyestuffs can be dissolved separately in the dyebath or they may be premixed with the ammo-

EXAMPLES 34-38

Using the procedure of Example 1B(a) replacing the ammonium chloride by an equal weight of the following ammonium salts similar dyeings are obtained.

Examples 34 — Ammonium sulphate
Example 35 — Ammonium hydrogen sulphate
Example 36 — Ammonium dihydrogen phosphate
Example 38 — Ammonium bromide

EXAMPLES 39-44

Using the procedure of Example 24 replacing the ammonium chloride by an equal weight of the following ammonium salts similar dyeings are obtained.

Example 39 — Ammonium tartrate
Example 40 — Ammonium acetate
Example 41 — Ammonium citratate
Example 42 — Ammonium formate
Example 43 — Ammonium benzene sulphonate
Example 44 Ammonium adipate

EXAMPLE 45

The procedure of Example 1B(a) is followed except that in place of 20gm/litre of ammonium chloride, 20gm/liter of orthophosphoric acid is added to the dyebath followed by adjusting the pH to 6.0 with aqueous ammonia solution (d = 0.88) thereby forming ammonium phosphate in situ. Similar dyeing to Example 1B(a) were obtained.

EXAMPLE 46-48

The procedure of Example 1B(a) is repeated replacing the 30g./liter of dicyandiamide with 100g./liter of cyanamide when similar results are obtained. Similar dyeings using 10g./liter of cyanamide (Example 47) of dicyandiamide (Example 48) gave dye fixation somewhat lower than that obtained in Example 1B(a) but still at a significant level.

EXAMPLE 49

To the dyebath of Example 1B(a) there is added 20g./liter of Dispersol Red D-2G (C.I. Disperse Red No282). A 50:50 cotton/polyester fabric is padded in this dyebath to 55% expression. The cloth is dried and baked as described in Example 1B(a) and washed to remove loose dyestuff by passing the fabric through a continuous washing train providing 30 seconds of each of cold rinse, hot (60° C.) rinse, boil in 0.2% NaOH containing 0.2% Synperonic BD, cold rinse, 2% acetic acid and final cold rinse. Both types of fibre in the fabric are dyed red.

EXAMPBLE 50

The procedure of Example 49 is repeated replacing the Dispersol Red D-2G by 4-nitro-2'-acetylamino-4'-[N:N-di(β-methoxycarbonylethyl)amino]amino]azobenzene. The fabric is again dyed red on both types of fibre present.

EXAMPLE 51

Two print pastes are made up from the following components:

| | | |
|---|---|---|
| a 10% aqueous solution of the Dyestuff of Example 22 | 8 | 8 |
| Cyanamide (as 50% aqueous solution) | 6 | 6 |
| Dicyanamide | 2 | 2 |
| Indalca PA-3R (mannogalactan ether thickener) | 50 | 50 |
| Ammonium chloride | — | 1 |
| Water | 34 | 33 |
| | 100 | 100 |

The pH of the above pastes are adjusted to 5.3 by the addition of phosphoric acid. The resultant print pastes are roller printed to mercerised cotton and fixation effected by either (a) heating for 1 min. at 200° C. or (b) high temperature steaming for 6 mins. at 180° C. The prints are rinsed in cold water, washed for 5 mins- at 80° C. in a solution containing 2g./1. Synperonic BD and 6g./1. caustic soda (70° Tw) and finally rinsed in cold water until neutral, followed by drying.

The prints from the paste containing ammonium chloride gave a considerably higher visual colour yield than the corresponding prints without ammonium chloride.

What we claim is:

1. A process for the colouration of a hydroxy substituted organic polymeric substrate by heating it to at least 93° C. with a water-soluble dyestuff containing one or more groups of the formula:

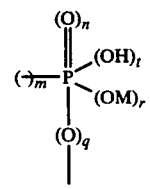

where
M is a metal
n is 0 or 1
q is 0 or 1
m is 0, 1 or 2
r = 1 or 2
t = 0 or 1 and r+t is not greater than 2 and when n = 1, m+t+r+q is not greater than 3, together with a carbodiimide and a salt of ammonia or a volatile amine.

2. A process as claimed in claim 1 wherein the dyestuffs contain one or more groups of the formula:

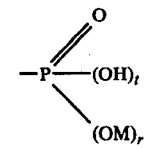

where M, t, r and t+r have the meanings given in claim 1.

3. A process as claimed in claim 1 wherein the dyestuff has 1 or 2 phosphorus acid groups as defined therein.

4. A process as claimed in 1 wherein M is magnesium, lithium, potassium or sodium.

5. A process as claimed in claim 4 wherein M is sodium.

6. A process as claimed in claim 1 wherein the salt of ammonia or a volatile amine is a salt of ammonia.

7. A process as claimed in claim 6 wherein the salt of ammonia is ammonium chloride.

8. A process as claimed in claim 1 wherein the carbodiimide is cyanamide or dicyandiamide.

9. A composition comprising a dyestuff as defined in claim 1 in admixture with a salt of ammonia or a volatile amine and/or a carbodiimide.

10. A composition as claimed in claim 1 whenever additionally incorporating a disperse dyestuff.

11. In a process for the colouration of hydroxy substituted organic polymeric substrate by heating to at least 93° C. with a water-soluble dyestuff bearing one or more phosphorus acid groups in the presence of a carbodiimide, the improvement which comprises having the phosphorus acid groups of the dyestuff in the form of a metal salt and the colouration is conducted together with a salt of ammonia or a volatile amine.

* * * * *